US 6,879,706 B2

(12) United States Patent
Satoh et al.

(10) Patent No.: US 6,879,706 B2
(45) Date of Patent: Apr. 12, 2005

(54) APPARATUS AND METHOD FOR DETECTING TRAFFIC LANE MARK FOR AUTOMOTIVE VEHICLE

(75) Inventors: Hiroshi Satoh, Yokohama (JP); Masafumi Tsuji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 663 days.

(21) Appl. No.: 10/022,356

(22) Filed: Dec. 20, 2001

(65) Prior Publication Data

US 2002/0080019 A1 Jun. 27, 2002

(30) Foreign Application Priority Data

Dec. 27, 2000 (JP) ........................ 2000-397590

(51) Int. Cl.[7] .............................................. G06K 9/00
(52) U.S. Cl. ................ 382/104; 382/199; 701/117; 340/907
(58) Field of Search ........................... 382/103, 104, 382/105, 106, 107, 154, 168, 181, 190, 199, 201, 236, 256, 260, 274, 285, 286, 291, 295, 305; 701/117, 118, 202, 301, 207, 28; 340/941, 931, 933, 907; 345/756, 782; 356/27, 29

(56) References Cited

U.S. PATENT DOCUMENTS

| | | | | |
|---|---|---|---|---|
| 4,868,752 A | * | 9/1989 | Fujii et al. ................ | 701/28 |
| 4,970,653 A | * | 11/1990 | Kenue ....................... | 701/301 |
| 5,410,346 A | * | 4/1995 | Saneyoshi et al. ......... | 348/116 |
| 5,638,116 A | * | 6/1997 | Shimoura et al. .......... | 348/118 |
| 5,904,725 A | * | 5/1999 | Iisaka et al. ............... | 701/207 |
| 6,091,833 A | * | 7/2000 | Yasui et al. ................ | 382/104 |
| 6,285,393 B1 | * | 9/2001 | Shimoura et al. .......... | 348/119 |
| 6,342,845 B1 | * | 1/2002 | Hilliard et al. ............. | 340/941 |
| 6,625,315 B2 | * | 9/2003 | Laumeyer et al. .......... | 382/190 |

FOREIGN PATENT DOCUMENTS

| | | |
|---|---|---|
| EP | 0 390 583 A2 | 10/1990 |
| JP | 8-249597 | 9/1996 |

OTHER PUBLICATIONS

D. Frank, "Road Markings Recognition", Proceedings of the International Conference on Image Processing (ICIP), IEEE, vol. 1, Sep. 16–19, 1996, pp. 669–672.
C. Taylor, et al., "A Real–Time Approach to Stereopsis and Lane–Finding", Intelligent Vehicles Symposium, Proceedings of the 1996 IEEE, Sep. 19–20, 1996, pp. 207–212.
U.S. Appl. No. 10/021,074, filed Dec. 19, 2001, inventor Tsuji.
U.S. Appl. No. 09/946,925, filed Sep. 6, 2001, inventor Satoh et al.
U.S. Appl. No. 09/963,490, filed Sep. 27, 2001, inventor Furusho.
U.S. Appl. No. 09/987,258, filed Nov. 14, 2001 inventor Akutagawa.

* cited by examiner

*Primary Examiner*—Bhavesh M. Mehta
*Assistant Examiner*—Seyed Azarian
(74) *Attorney, Agent, or Firm*—Foley & Lardner LLP

(57) ABSTRACT

In apparatus and method for detecting a traffic lane mark for an automotive vehicle, a plurality of traffic lane detection windows are set in a manner for the traffic lane to be included in each traffic lane detection window from an image data photographed by a photograph device, the traffic lane mark is detected from a luminous intensity information within each traffic lane detection window of each coordinate point, a plurality of noise detection windows are set at positions which abut the respective traffic lane detection windows, an edge intensity within each noise detection window is detected; a weight value to a predetermined number of the traffic lane detection windows is modified in accordance with the edge intensity in the noise detection window; and a road contour is calculated using the traffic lane detected at the window internal traffic lane detecting and the modified weight value.

17 Claims, 7 Drawing Sheets

COORDINATE POINT ON PHOTOGRAPHED IMAGE

PRECEDING VEHICLE

WHITE LINE DETECTION WINDOW

APPARATUS AND METHOD FOR DETECTING TRAFFIC LANE MARK FOR AUTOMOTIVE VEHICLE

BACKGROUND OF THE INVENTION

1. Field of the Invention

The present invention relates to apparatus and method for detecting a traffic lane mark (,i.e., a white line and/or a yellow line) drawn on a road surface using a camera (CCD camera) mounted on an automotive vehicle and for outputting an information such as a contour (or shape) and a position of the traffic lane.

2. Description of the Related Art

A Japanese Patent Application First Publication No. Heisei 8-249597 (JP8249597) published on Sep. 27, 1996 exemplifies a previously proposed traffic lane mark detecting apparatus.

In the previously proposed traffic lane detecting apparatus disclosed in the above-described Japanese Patent Application First Publication includes: a photograph device to photograph a situation of a running road in a vehicular forward direction; an edge point extracting section that extracts edge components from image data of the photograph device; a window setting section that sets a plurality of windows in a manner to include a traffic lane indicating line (so-called, traffic lane mark) from the image data which extracts the edge components; an edge point counting section that counts point numbers of edges present on each line segment for all line segments which can be generated by connecting mutual points on two lateral sides facing each other on each window set by the window setting section; a straight line detecting section that detects one of the line segments which has a largest edge point count value obtained for each window by the edge point counting section as a detected straight line within a corresponding window of the respective windows; an interrupted vehicle detecting section that detects a preceding vehicle which has entered the same traffic lane in front of the vehicle (hereinafter, also called a host vehicle) from another neighboring traffic lane (hereinafter, called an interrupted preceding vehicle); a weight value modifying section that modifies a weight value to any windows in which the interrupted preceding vehicle is detected; and a road contour detecting section that detects the traffic lane indicating line according to the detected straight line of each window and the weight value thereof and detects a road contour according to the detected traffic lane indicating line. Thus, an accuracy of the detection of the traffic lane indicating line can be improved and the detection thereof can be processed at a high speed.

SUMMARY OF THE INVENTION

However, since, in the previously proposed traffic lane mark detecting apparatus described above, the interrupted preceding vehicle is detected on the basis of the point number of edge components within the white line detection window, in a case where a pattern of the vehicle is very similar to that of the white line, this pattern is detected as the white line but not detected as the interrupted preceding vehicle. Hence, the accuracy of detection of the white line, viz., the traffic lane mark is lowered. In addition, if a branched road or a double white line (parallel running white lines) is to be detected, a white line other than that on a trunk road would erroneously be detected.

It is, hence, an object of the present invention to provide improved apparatus and method for detecting a traffic lane mark without an influence of a preceding vehicle which is running ahead of the vehicle generally at the same speed as the host vehicle, the interrupted preceding vehicle, joined road/ branched road, or a double white line on the detection of the traffic lane mark, i.e., the white line and with a superior accuracy of the detection of the traffic lane mark.

According to one aspect of the present invention, there is provided an apparatus for detecting a traffic lane mark for an automotive vehicle, comprising: a photograph device (1) to photograph a situation of a running road in a vehicular forward direction; a traffic lane detection window setting section (3) that once sets one traffic lane detection window on an image data photographed by the photograph device; a window internal traffic lane detecting section (2) that detects a traffic lane mark passing through the traffic lane detection window set by the traffic lane detection window setting section on the basis of a luminance information on each point within the traffic lane detection window, the window lane detection setting section (3) setting a plurality of other traffic lane detection windows in accordance with the one traffic lane detection window through which the traffic lane mark is passed and the window internal traffic lane detecting section (2) detecting the traffic lane mark passing through each of the other traffic lane detection windows set by the traffic lane detection window setting section (3) on the basis of the luminance information on each point of the other traffic lane detection windows; a noise detection window setting section (4) that sets at least one noise detection window at a position which abuts each of the traffic lane detection windows set by the traffic lane detection window setting section; an edge intensity detecting section (5) that detects an edge intensity within each noise detection window set by the noise detection window setting section; a weight value modifying section (6) that modifies a weight value to each of the traffic lane detection windows in accordance with the edge intensity in the related one of the noise detection windows; and a road contour calculating section (7) that calculates a road contour using any of the traffic lane marks detected by the window internal traffic lane detecting section and the weight value modified by the weight value modifying section.

According to another aspect of the present invention, there is provided a method for detecting a traffic lane mark for an automotive vehicle, comprising: photographing a situation of a running road in a vehicular forward direction; once setting a traffic lane detection window on an image data photographed by the photograph device; detecting a traffic lane mark passing through the once set traffic lane detection window on the basis of a luminance information on each point within the once set traffic lane detection window; setting a plurality of other traffic lane detection windows in accordance with the once set traffic lane detection window through which the traffic lane mark is passed; detecting the traffic lane mark passing through each of the other traffic lane detection windows on the basis of the luminance information on each point of each corresponding other traffic detection windows; setting at least one noise detection windows at a position which abuts each of the traffic lane detection windows; detecting an edge intensity within each noise detection window; modifying a weight value to each of the traffic lane detection windows in accordance with the edge intensity in the related one of the noise detection windows; and calculating a road contour using any of the detected traffic lane marks and the modified weight value.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
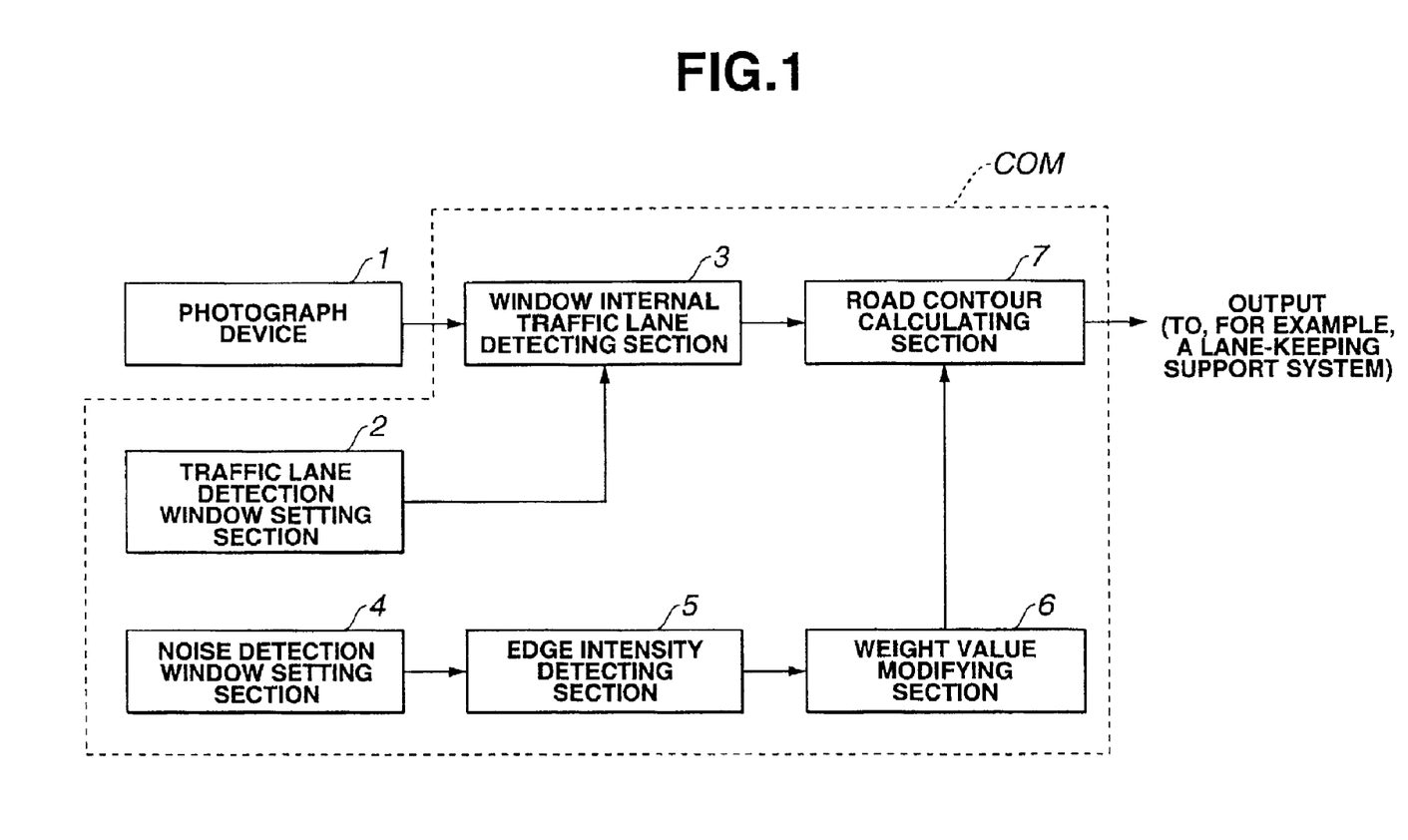
FIG. 1 is a functional block diagram representing a preferred embodiment of a vehicular traffic lane mark detecting apparatus according to the present invention.
Figure 2:
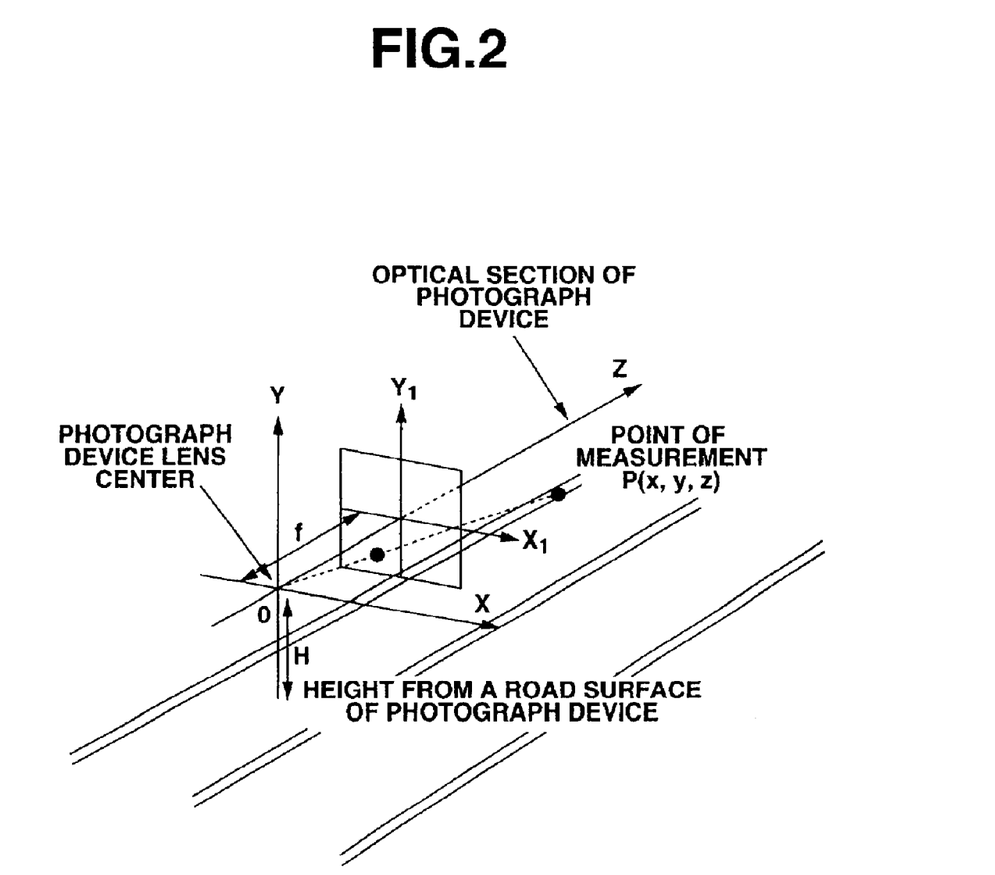
FIG. 2 is an explanatory view for explaining a coordinate transform process to be executed in a traffic lane mark detection window in the vehicular traffic lane mark detecting apparatus according to the present invention shown in FIG. 1.
Figure 3:
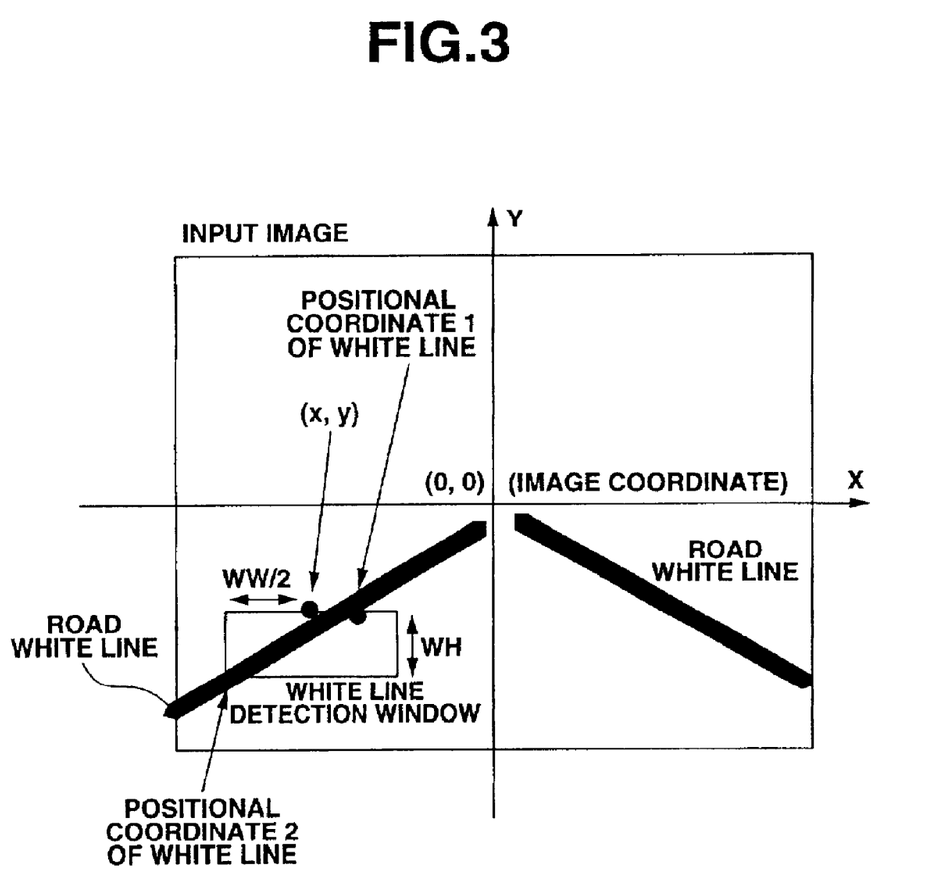
FIG. 3 is an XY coordinate graph representing one example of the traffic lane mark detection window.
Figure 4A:
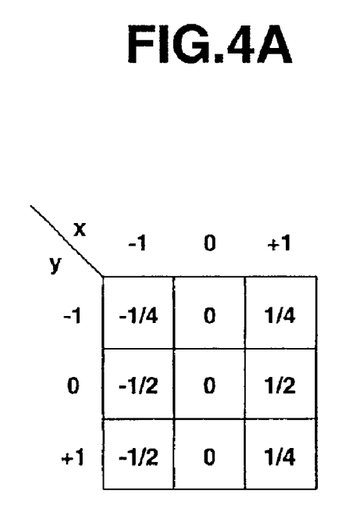
FIGS. 4A and 4B are explanatory views for explaining an edge detection process (longitudinal edge detection process) executed in a window internal traffic lane detecting section of the vehicular traffic lane detecting apparatus shown in FIG. 1.
Figure 4B:
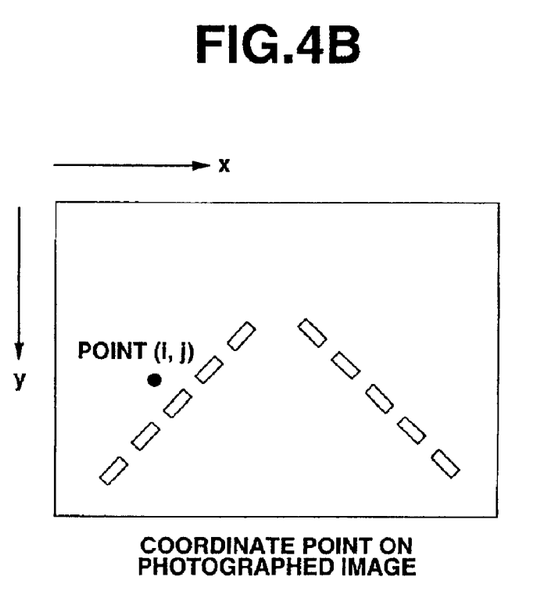
Figure 5:
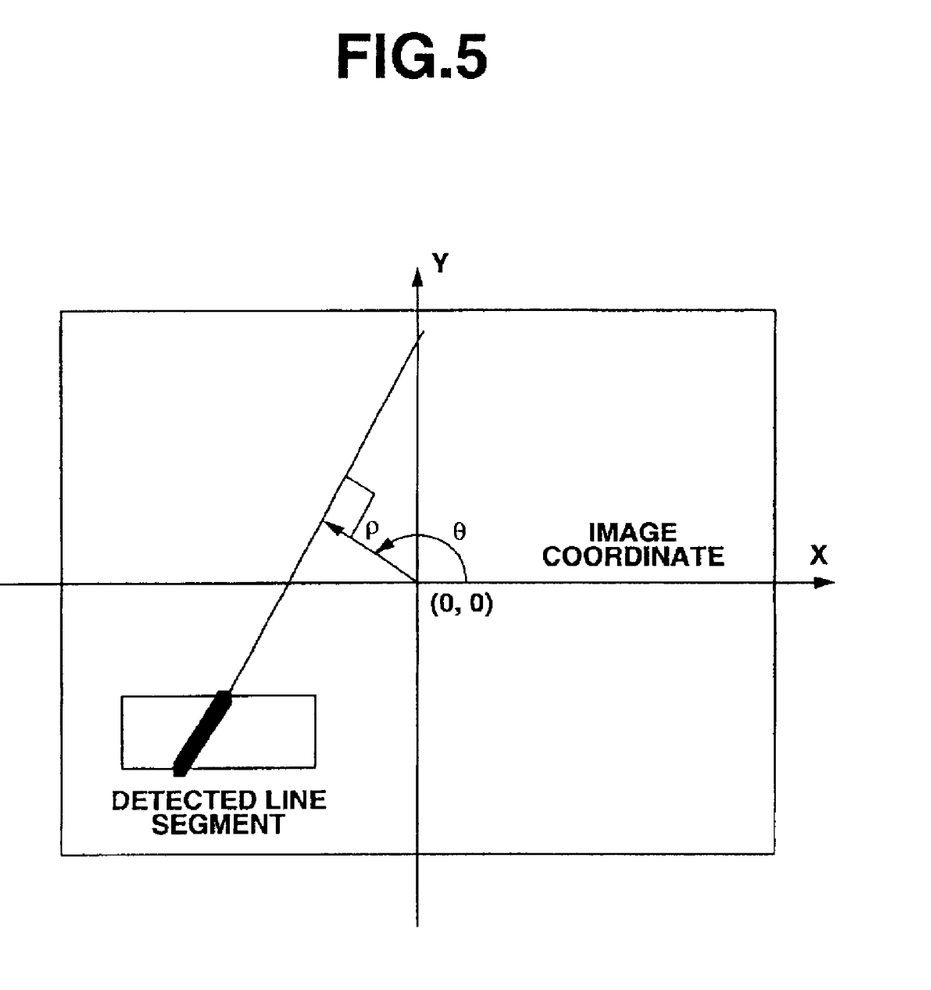
FIG. 5 is an explanatory view for explaining a Hough transform executed in the window internal traffic lane detecting section of the vehicular traffic lane mark detecting apparatus shown in FIG. 1.
Figure 6:
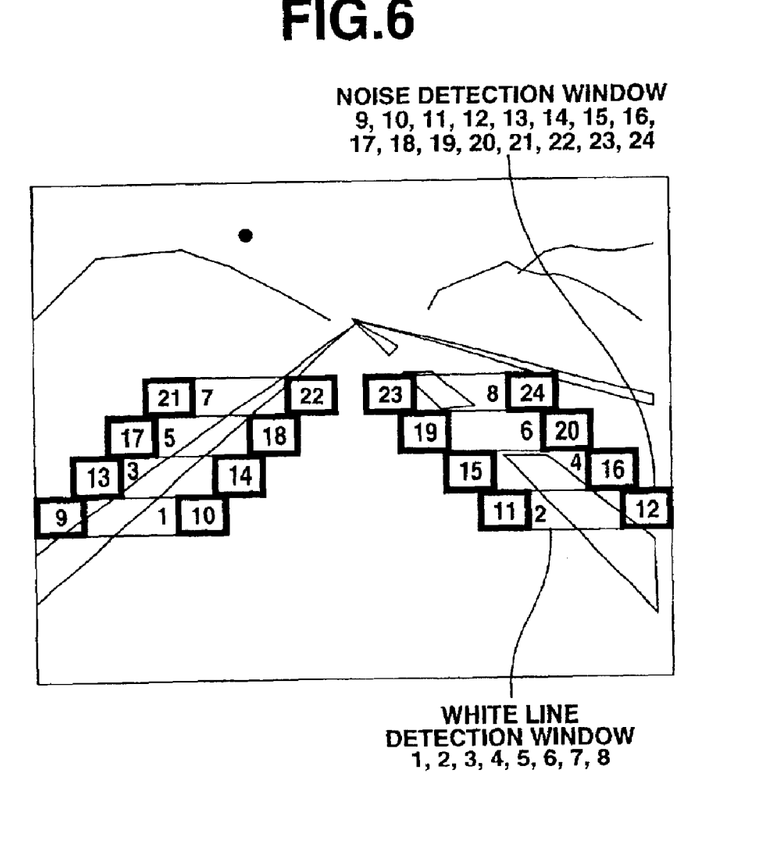
FIG. 6 is an explanatory view representing one example of setting the traffic lane mark detection windows and noise detection windows in the vehicular traffic lane mark detecting apparatus shown in FIG. 1 (a case where no preceding vehicle is present).
Figure 7:
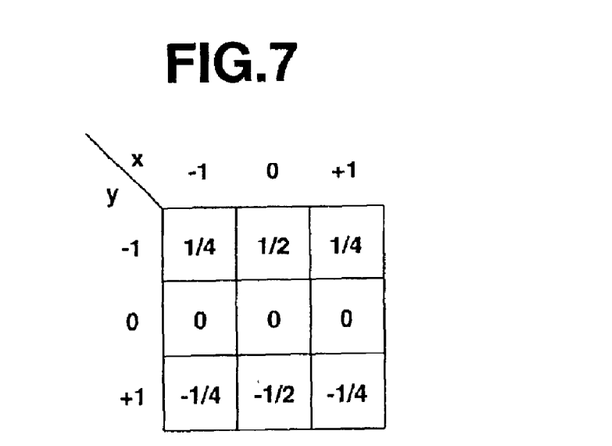
FIG. 7 is an explanatory view for explaining an edge detection process (lateral edge filter and detection process) executed in an edge intensity detecting section of the vehicular traffic lane mark detecting apparatus shown in FIG. 1.
Figure 8:
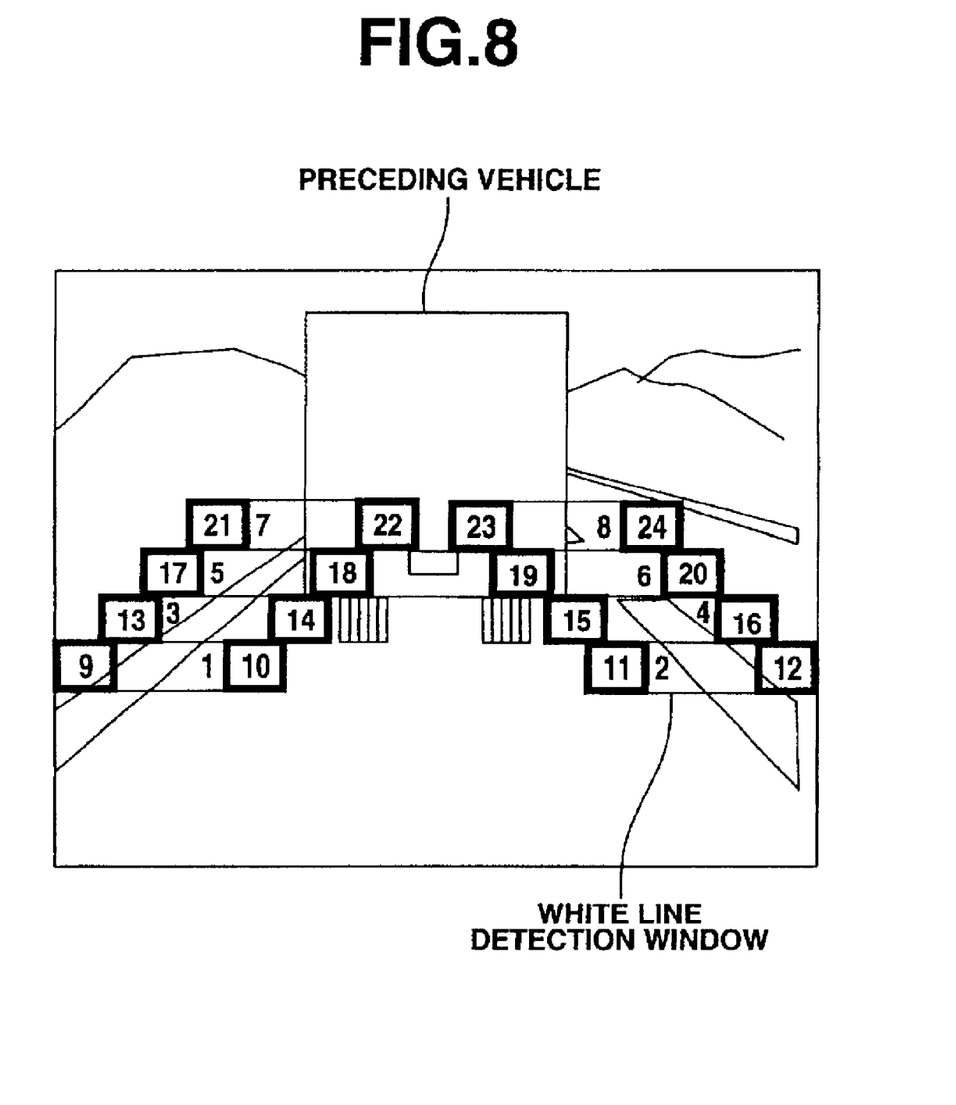
FIG. 8 is an explanatory view representing traffic lane detection windows and noise detection windows in an image photographed by a photograph device shown in FIG. 1 (a case where a preceding vehicle which is running ahead of the host vehicle at the same traffic lane is present).

FIG. 1 shows a functional block diagram representing a preferred embodiment of an apparatus for detecting a traffic lane mark for an automotive vehicle (hereinafter also referred to as a vehicular traffic lane mark detecting apparatus) according to the present invention. FIG. 2 shows an explanatory view for explaining a coordinate transform process to be executed in a traffic lane mark detection window in the vehicular traffic lane mark detecting apparatus. FIG. 3 shows a coordinate graph representing one example of the traffic lane mark detection window. FIGS. 4A and 4B are explanatory views for integrally explaining an edge detection process (longitudinal edge detection process) executed in a window internal traffic lane detecting section of the vehicular traffic lane detecting apparatus shown in FIG. 1. FIG. 5 shows an explanatory view for explaining a Hough transform executed in the window internal traffic lane detecting section of the vehicular traffic lane mark detecting apparatus shown in FIG. 1. FIG. 6 shows an explanatory view representing one example of setting the traffic lane mark detection windows and noise detection windows in the vehicular traffic lane mark detecting apparatus shown in FIG. 1. FIG. 7 shows an explanatory view for explaining an edge detection process (lateral edge detection process) executed in an edge intensity detecting section of the vehicular traffic lane mark detecting apparatus shown in FIG. 1. FIG. 8 is an explanatory view representing traffic lane detection windows and noise detection windows in an image photographed by a photograph device shown in FIG. 1 (a case where a preceding vehicle which is running ahead of the host vehicle at the same traffic lane is present).

As shown in FIG. 1, the vehicular traffic lane mark detecting apparatus includes a photograph device 1; a traffic lane detection window setting section 2, a window internal traffic lane detecting section 3, a road shape (or contour) calculating section 7, a noise detection window setting section 4, an edge intensity detecting section 5, and a weight value modifying section 6. It is noted that COM shown in FIG. 1 denotes an image processing system constituted by a microcomputer and a virtual display indicating an intermediate process procedure.

Photograph device 1 is constituted by a CCD (Charge Coupled Device) camera, for example, mounted on a vehicular front roof portion of a passenger compartment of the vehicle to photograph a situation of the running road placed in front of the host vehicle. An image data photographed by photograph device 1 is supplied to a window internal traffic lane detecting section 3. Traffic lane detecting window setting section 2 serves to once determine a position of a small region of a displayed image screen (hereinafter, referred to as a traffic lane detection window) by the use of which a traffic lane detection process is executed within the image data photographed by photograph device 1

The following technique is adopted in the determination of the position of a first traffic lane detection window 1 (refer to FIG. 6). That is to say, as shown in FIG. 2, a coordinate point of a photographed image which is a two-dimensional spatial coordinate is determined from a coordinate point of the traffic lane in a three-dimensional space of the image of a road surface in vehicular forward direction. Then, a region spread by a predetermined range (as will be described later) surrounding the coordinate point in the two-dimensional spatial coordinate is set to the traffic lane detection window 1. As shown in FIG. 2, suppose that a coordinate system of the image photographed by photograph device 1 is X1, Y1 and another coordinate system (actual spatial coordinates) with a center of a lens of photograph device 1 as an origin 0 is X, Y, Z. At this coordinate system, a point (x, y, z) is displayed on the image screen at a position (x1, y1) using the following equations (1) and (2).

$$x1 = x \cdot f/z \quad (1)$$

$$y1 = y \cdot f/z \quad (2),$$

wherein f denotes a focal distance from the lens center of photograph device to the two-dimensional coordinate origin.

Since y=H (H denotes a height of the photograph device 1 from the ground (the road surface)) as shown in FIG. 2 with the case of the traffic lane on the road surface taken into account), the coordinate of point P can be determined from the coordinates on the image screen as shown in the following equations (3) and (4).

$$x = x1 \cdot z/f \quad (3)$$

$$z = f \cdot H/y1 \quad (4)$$

$$\therefore x = x1 \cdot H/y1 (y = y1 \cdot z/f, z = f \cdot H/y1)$$

FIG. 3 shows an example of the traffic lane detection window (for example, traffic lane detection window 1 with no presence of any other traffic lane detection windows) denoted by a small rectangular form set in the way described above.

Next, window internal traffic lane detecting section 3 serves to detect the traffic lane from a luminous intensity (luminance) within the traffic lane detection window. Then, the subsequent (other) traffic lane detection windows are set by the traffic lane detection window setting section 2. Specifically, edge components within the traffic lane detection window 1 set by traffic lane detection window setting section 2 are detected using a longitudinal edge detection method. A calculation example in a case where a longitudinal edge detection filter shown in FIG. 4A is described in the following equation (5).

$$Idx(i, j) = I(i+1, j-1)/4 + I(i+1, j)/2 + I(i+1, j+1)/4 - I(i-1, j-1)/4 - I(i-1, j)/2 - I(i-1, j+1)/4 \quad (5)$$

In the equation (5), I(i, j) denotes a luminance (or luminous intensity) value at a point (i, j) and Idx(i, j) denotes a longitudinal edge intensity of point (i, j). Hence, since the longitudinal edge is present at point (i, j) at which Idx(i, j) indicates a numerical value other than zero, the longitudinal edge can be detected (refer to FIG. 4B).

Next, a Hough transform is carried out with respect to a longitudinal edge image determined as described above. The Hough transform is a transform process such that an edge point on XY coordinates is transformed into a line segment on $\rho\theta$ coordinates of a pole coordinate system. [$\rho$, $\theta$] which takes a maximum value hmax (each edge intersect point) in $\rho\theta$ coordinates after the transform of all edge points into the $\rho\theta$ coordinates represents a pole coordinate linear equation passing within the traffic detection window (first traffic lane detection window 1). In addition, if the maximum value hmax is larger than a preset threshold value TH0 (hmax>TH0), the detected straight line (first order linear equation) is determined to indicate the traffic lane mark. The threshold value TH0 is determined as follows: That is to say, since a case where the straight line is in parallel to Y coordinate indicates a least number of edges and indicates a height WH of the traffic lane detection window 1, a value of the threshold TH0 is, for example, 0.5 to the height of WH (the height of the traffic lane detection window).

If the maximum value hmax is larger than threshold value TH0, a position of the traffic lane within the traffic lane detection window 1 is calculated from the linear equation of the pole coordinates calculated in the Hough transform. Suppose that the function of the traffic lane mark is y=ax+b. It is noted that y=ax+b is derived from a Hough transform formula, namely, $\rho$=x cos $\theta$+y sin $\theta$.

Then, the following equations are established:

$$a = \tan(\theta - \pi/2) \; (\therefore a = y/x = \cos\theta/\sin\theta \text{ and } b=0), \; b = \rho/\sin\theta (\therefore y = \rho/\sin\theta \text{ and } y=0) \quad (6).$$

Furthermore, suppose, in the equation (6), the x coordinate value in a case where y=Y is xST and the x coordinate value in a case where y=Y+WH is xED, a positional coordinate 1 of the traffic lane (xST, Y) and a positional coordinate 2 (xED, Y−WH) are obtained. The above-described processing is carried out for all other traffic lane detection windows 2 through 8 (refer to FIG. 6) in odd numbers and, then, in even numbers set by traffic lane detection window setting section 2. However, a traffic lane detection order within each traffic lane detection window is an arbitrary.

Then, noise detection window setting section 4 serves to set noise detection windows. In this embodiment, one noise detection window having a predetermined height and a predetermined width is set at an adjacent position to each corresponding traffic lane detection window, viz., at a left end to each corresponding traffic lane detection window and the other noise detection window having the same height and width is set to an adjacent position to each corresponding traffic lane detection window, viz., at a right end thereof. The predetermined height of each noise detection window setting section is the same height as each traffic lane detection window and the predetermined width is approximately 10 pixels. FIG. 6 shows a setting example of the traffic lane detection windows (white line windows 1 through 8 and noise detection windows 9 through 24) and the noise detection windows.

Edge intensity detecting section 5 serves to detect an edge intensity within one noise detection window for each noise detection window set by noise detection window setting section 4. A differential process can be used for the detection of the edge intensity. An example of the differential process includes a detection of a lateral edge intensity. An example of calculation in a case where a lateral edge detection filter is used in a lateral edge detection method is shown in the following equation (7) (refer to FIG. 7)

$$Idy(i, j) = I(i-1, j-1)/4 + I(i, j-1)/2 + I(i+1, j-1)/4 - I(i-1, j+1)/4 - I(i, j+1)/2 - I(i+1, j+1)/4 \quad (7)$$

It is noted that I(i, j) denotes the luminance value of point (i, j) and Idy(i, j) denotes a lateral edge intensity of point (i, j). Hence, since the lateral edge is present at point (i, j) at which the value of Idy(i, j) indicates a numerical value other than 0, the lateral edge can be detected.

Weight value modifying section 6 serves to modify a weight value to each traffic lane detection window according to the edge intensity detected in the corresponding noise detection window in which the lateral edge detection is carried out. One example of modifying the weight value will be described below. That is to say, when the edge intensity within any one of the noise detection window detected by edge intensity detecting section 5 is large (strong) enough to be equal to or larger than a predetermined value, both of a result of detection of the traffic lane in one of the traffic lane detection windows which is (laterally) adjacent to one of the noise detection windows within which the edge intensity is large enough to be equal to or larger than the predetermined value and that of another of the traffic lane detection windows which is located at a more forward (upper) position of the image screen are cleared. Another example thereof will be described below. That is to say, if the edge intensity in any one of the noise detection windows is large enough to be equal to or larger than the predetermined value, both of the traffic lane detection process by the window internal traffic lane detecting section 3 in the corresponding traffic lane detection window adjacent to the corresponding noise detection window within which the edge intensity is large enough to the same and that in another of the traffic lane detection windows which is located at the more forward (an upper position in the image screen) position are not executed. In the latter case, number of windows within which the traffic lane detection process described above is executed can become less. Thus, a processing speed (time) can be shortened.

Road contour calculating section 7 calculates the road contour using the traffic lane detected by window internal traffic lane detecting section 3 and the weight value modified by weight value modifying section 6. One of the following technique can be used as an example of calculation of the road contour.

That is to say, the contour of the photographed traffic lane is calculated by approximating the traffic lane line segments in a broken line form from the straight lines detected by window internal traffic lane detecting section 3 within the respective traffic lane detection windows. Then, road contour calculating section 7 can calculate the contour of the road in the vehicular forward direction by projecting the photographed contour of the traffic lane into the three-dimensional space in an opposite way as described in traffic lane detection window setting section 2.

Next, an operation of the vehicular traffic lane mark detecting apparatus in the preferred embodiment will be described below.

FIG. 6 shows the explanatory view representing one example of an image photographed by photographing device 1 when the preceding vehicle is not present in the vehicular forward direction and the vehicular traffic lane mark detecting apparatus is placed at a position above the road surface on which the vehicle is running. As shown in FIG. 6, the road surface is drawn in such traffic lane marks as to sort a vehicular running lane into left and right lanes as viewed from the photographed device 1, the traffic lane detection windows 1 through 8 and the noise detection windows 9 through 24 are set on the image screen in FIG. 6. Since, on a photographed image screen, each noise detection window 9 through 24, is a region in which the edge components are small (weak), edge intensity detecting section 5 outputs a result such that the edge intensity of each noise detection window 9 through 24 is "small (weak)". Weight value modifying section 6, upon receipt of this result of small (weak) edge intensity, does not operate anything about the result of traffic lane detection windows 1 through 8 since the edge intensity on all noise detection windows 9 through 24 are small. Road contour calculating section 7, then, calculates the road contour (shape) using the results of detections over all traffic lane detection windows 1 through 8 since neither preceding vehicle nor the interrupted preceding vehicle appears on the input image.

FIG. 8 shows schematically explanatory view representing the traffic lane detection windows 1 through 8 on the image photographed by photograph device 1. As shown in FIG. 8, only the traffic lane mark is present on traffic lane detection windows 1 through 6 and both of (parts of) the preceding vehicle and traffic lane mark are viewed and present within traffic lane detection windows 7 and 8. Neither the traffic lane nor the preceding vehicle is present within noise detection windows 9, 10, 11, 12, 13, 14, 15, 16, 17, 20, 21, and 24. On the other hand, (parts of) the preceding vehicle is present within several noise detection windows 18, 19, 22, and 23. In this case, edge intensity detecting section 5 outputs such a result that the edge intensity is "large (strong)". Consequently, weight value modifying section 6 clears the traffic lane detection results of traffic lane detection windows 5, 6, 7, and 8. Then, road contour calculating section 7 calculates the road contour using only the detection results in traffic lane detection windows 1, 2, 3, and 4 since the information on the traffic lane mark within the traffic lane detection windows 5, 6, 7, and 8 is cleared.

As described above, since the road contour is calculated using the result of detection of any windows in which only the traffic lane is present, a highly reliable detection of the traffic lane can be achieved even if the preceding vehicle is present. The vehicular traffic lane mark detecting apparatus in the preferred embodiment is applicable to a traffic lane-keeping support system, a traffic lane missing alarm system, or a steering assistance system. That is to say, an output of road contour calculating section 7 is supplied to one of these systems, for example, the traffic lane-keeping support system. Hence, an accurate alarming and an appropriate assistance of steering or driving the vehicle can be achieved.

The vehicular traffic lane mark detecting apparatus according to the present invention is not limited to the above-described preferred embodiment. That is to say, various modifications and variations of the preferred embodiment can be made. For example, although, in the preferred embodiment, the lateral edge intensities for all noise detection windows have been detected in edge intensity detecting section 5, the lateral edge detection method may be used for each of the noise detection windows which is located at a position near to a center of the running road and the longitudinal edge detection method may be used for each of the noise detection windows which is located at an outer side of the running road with respect to the corresponding traffic lane detection window. As this alternative example applied to the case of FIG. 6, the lateral edge detection method may be used for the noise detection windows of 10, 11, 14, 15, 18, 19, 22, and 23 and the longitudinal edge detection method may be used for the noise detection windows 9, 12, 13, 16, 17, 20, 21, and 24. It is noted that the longitudinal edge detection method can be used as that described in the case of window internal traffic lane detecting section 3.

In order to reduce the influence of the preceding vehicle on the traffic lane detection as least as possible, it is necessary to detect at which position of the vehicular forward direction the preceding vehicle is placed. In addition, in order to prevent a reduction in reliability of the traffic lane detection due to a presence of the traffic lane mark hidden by the preceding vehicle, the weighting for the vehicular more forward positioned traffic lane mark than the position at which the preceding vehicle is present is reduced. Hence, the reliability of the detection of the traffic lane can, in turn, be increased. At this time, the use of the lateral edge detection method permits a more accurate detection of the position of the preceding vehicle. In addition, if the interrupted preceding vehicle from the adjacent traffic lane into the same traffic lane of the host vehicle is present, the traffic lane mark is hidden according to a lateral positional relationship between the interrupted preceding vehicle and the traffic lane. Hence, if the longitudinal edge detection method is used which can more accurately detect the lateral position of the interrupted preceding vehicle, the reduction of the reliability in the traffic lane detection due to the traffic lane hidden by the interrupted preceding vehicle can be prevented.

Another modification of the vehicular traffic lane mark detecting apparatus in the preferred embodiment can be made. When the edge intensity within one of the noise detection windows detected by edge intensity detecting section 5 is strong (or large) enough to be equal to or larger than the predetermined value, weight value modifying section 6 clears both of the results of detection of the traffic lane in one of the traffic lane detection windows which is adjacent to the above-described noise detection window and in the other of the traffic lane detection windows which is located at the more forward direction than the one traffic lane detection window. However, in place of it, if the edge intensity within the noise detection window detected by edge intensity detecting section 5, the noise detection window being located near to the center side from among the noise detection windows located at both left and right sides of the corresponding one of the traffic lane detection windows, indicates equal to or larger than the predetermined value continuously for a predetermined time or more, weight value modifying section 6 may clear both of the results of detections of the traffic lane in the two traffic lane detection windows one of which is located adjacent to the above-described noise detection window whose edge intensity is equal to or larger than the predetermined value continuously for the predetermined time and the other of which is located at the more forward direction than the one traffic lane detection window. In addition, when the edge intensity in any one of the noise detection windows which is located at the outer side to the running road is large enough to be equal to or larger than the predetermined value, weight value modifying section 6 clears only the result of detection of the traffic lane in one of the traffic lane detection windows which is adjacent to the noise detection window located at the outer side thereof in which the edge intensity is large enough to the equal to or larger than the predetermined value.

Since, if the preceding vehicle is present, a relative velocity between the vehicle (host vehicle) and the preceding vehicle is approximately zero, the preceding vehicle is approximately located at the same position on the photographed image. In addition, since, in a case of a symbol drawn on the road surface, the relative velocity corresponds to the vehicular velocity (of the host vehicle), the position of such a symbol as described on the image screen is varied with time. Hence, in a case where the edge intensity equal to or larger than the predetermined value continuously for the predetermined time or more in a certain noise detection window, an object whose relative velocity to the host vehicle is approximately zero is determined. This determination can achieve a more accurate detection of the preceding vehicle. Furthermore, since, in the preceding vehicle is present, the traffic lane mark located at the more forward direction than the preceding vehicle is hidden by the preceding vehicle, the influence of the preceding vehicle on the detection of the traffic lane can be eliminated by clearing the result of traffic lane in the traffic lane windows located at the more forward direction than the preceding vehicle. In addition, since, if the interrupted preceding vehicle is present, only the traffic lane mark which is located at a position on which the interrupted preceding vehicle is hidden but the other traffic lane mark can be detected by the window internal traffic lane detecting section 3, the traffic lane can be detected without excessive clear for the results of traffic lane detections. Consequently, the reliability of the traffic lane detection can be improved even if the interrupted preceding vehicle is present.

It is noted that the above-described preferred embodiment and modifications have been described in order to facilitate a better understanding of the present invention but in order not to limit the present invention, each essential elements disclosed in the preferred embodiment includes all modifications and equivalents belonging to a scope of the claims defining the present invention.

The entire contents of a Japanese Patent Application No. 2000-397590 (filed in Japan on Dec. 27, 2000) are herein incorporated by reference. The scope of the invention is defined with reference to the following claims.

What is claimed is:

1. An apparatus for detecting a traffic lane mark for an automotive vehicle, comprising:
    a photograph device to photograph a situation of a running road in a vehicular forward direction;
    a traffic lane detection window setting section that once sets one traffic lane detection window on an image data photographed by the photograph device;
    a window internal traffic lane detecting section that detects a traffic lane mark passing through the traffic lane detection window set by the traffic lane detection window setting section on the basis of a luminance information on each point within the traffic lane detection window, the window lane detection setting section setting a plurality of other traffic lane detection windows in accordance with the one traffic lane detection window through which the traffic lane mark is passed and the window internal traffic lane detecting section detecting the traffic lane mark passing through each of the other traffic lane detection windows set by the traffic lane detection window setting section on the basis of the luminance information on each point of the other traffic lane detection windows;
    a noise detection window setting section that sets at least one noise detection window at a position which abuts each of the traffic lane detection windows set by the traffic lane detection window setting section;
    an edge intensity detecting section that detects an edge intensity within each noise detection window set by the noise detection window setting section;
    a weight value modifying section that modifies a weight value to each of the traffic lane detection windows in accordance with the edge intensity in the related one of the noise detection windows; and
    a road contour calculating section that calculates a road contour using any of the traffic lane marks detected by the window internal traffic lane detecting section and the weight value modified by the weight value modifying section.

2. An apparatus for detecting a traffic lane mark for an automotive vehicle as claimed in claim 1, wherein the noise detection window setting section sets at least one noise detection window at the position which abuts one of elongation ends of each traffic lane detection window.

3. An apparatus for detecting a traffic lane mark for an automotive vehicle as claimed in claim 1, wherein the noise detection window setting section sets a plurality of noise detection windows at the positions which abut both of elongation ends of each traffic lane detection window.

4. An apparatus for detecting a traffic lane mark for an automotive vehicle as claimed in claim 1, wherein the edge intensity detecting section detects an intensity of a lateral edge to each of the noise detection windows which is located near to a center of the running road with respect to the corresponding one of the traffic lane detection windows and detects an intensity of a longitudinal edge to each of the noise detection windows which is located at an outer side of the running road with respect thereto.

5. An apparatus for detecting a traffic lane mark for an automotive vehicle as claimed in claim 1, wherein the weight value modifying section reduces the weight value for one of the traffic lane detection windows when the edge intensity detected in one of the noise detection windows which abuts the one traffic lane detection window is strong enough to be equal to or larger than a predetermined value.

6. An apparatus for detecting a traffic lane mark for an automotive vehicle as claimed in claim 1, wherein the weight value modifying section modifies the weight value to one of the traffic lane detection windows which abuts the corresponding one of the noise detection windows.

7. An apparatus for detecting a traffic lane mark for an automotive vehicle as claimed in claim 1, wherein the weight value modifying section reduces the weight value to at least one of the traffic lane detection windows which is located in the vehicular more forward direction than one of the noise detection windows which is located at a closer proximity to the vehicle and in which the edge intensity detected by the edge intensity detecting section which is equal to or larger than a predetermined value is detected.

8. An apparatus for detecting a traffic lane mark for an automotive vehicle as claimed in claim 1, wherein the weight value modifying section reduces the weight value to at least one of the traffic lane detection windows which is located in the vehicular more forward direction than one of the noise detection windows in which the edge intensity which is equal to or larger than the predetermined value is detected by the edge intensity detecting section and which is located at a center side of the running road and is placed at a closer proximity to the vehicle and wherein the weight value modifying section reduces the weight value to one of the traffic lane detection windows which abuts the corresponding one of the noise detection windows which is located at an outer side of the running road with respect to the corresponding traffic lane detection window and in which the edge intensity which is equal to or larger than a predetermined value is detected.

9. An apparatus for detecting a traffic lane mark for an automotive vehicle as claimed in claim 1, wherein the weight value modifying section reduces the weight value to each one of the traffic lane detection windows which abuts each corresponding one of the noise detection windows when the edge intensity which is equal to or larger than a predetermined value continuously for a predetermined time or more is detected in the same noise detection window.

10. An apparatus for detecting a traffic lane mark for an automotive vehicle as claimed in claim 7, wherein the weight value modifying section clears results of detections of the traffic lane mark in one of the traffic lane detection windows which abuts the corresponding one of the noise detection windows in which the edge intensity which is equal to or larger than the predetermined value is detected and in the other of the traffic lane detection windows which is located at the vehicular more forward direction than the traffic lane detection window which abuts the corresponding noise detection window in which the edge intensity is equal or larger than the predetermined value.

11. An apparatus for detecting a traffic lane mark for an automotive vehicle as claimed in claim 1, wherein the window internal traffic lane detecting section detects the traffic lane mark in each traffic lane detection window using a longitudinal edge detection filter as follows:

$$Idx(i, j)=I(i+1, j-1)/4+I(i+1, j)/2+I(i+1, j+1)/4-I(i-1, j-1)/4-I(i-1, j)/2-I(i-1, j+1)/4,$$

wherein $I(i, j)$ denotes a luminous intensity of a X Y coordinate point $P(i, j)$ in the traffic lane detection window and $Idx(i, j)$ denotes a longitudinal edge intensity value at the point $(I, j)$, executes a Hough transform for all edge points which indicates numerical values of $Idx(i, j)$ except zero, determines a first-order linear equation in a pole coordinate system passing through the one of the traffic lane detection windows set by the traffic lane detection window setting section which takes a maximum value hmax in pole coordinates $[\rho, \theta]$, determines a largest maximum value hmax which is larger than a threshold value TH0, and determines a straight line determined from the linear equation passing through the one traffic lane detection window to be the traffic lane mark from the maximum value hmax of the pole coordinate system.

12. An apparatus for detecting a traffic lane mark for an automotive vehicle as claimed in claim 1, wherein the edge intensity detecting section detects the edge intensity for each of the noise detection windows set by the noise detection window setting section using a lateral edge filter as follows:

$$Idy(i, j)=I(i-1, j-1)/4+I(i, j-1)/2+I(i+1, j-1)/4-I(i-1, j+1)/4-I(i, j+1)/2-I(i+1, j+1)/4$$

wherein $I(i, j)$ denotes a luminous intensity of the coordinate point $P(i, j)$ and $Idy(i, j)$ denotes a lateral edge intensity value at the point $P(i, j)$ and at the point $P(i, j)$ where the value of Idy which indicates a numerical value expect zero is the presence of the lateral edge.

13. An apparatus for detecting a traffic lane mark for an automotive vehicle as claimed in claim 12, wherein the edge intensity detecting section detects the edge intensity for each of the noise detection windows which is located near to a center side of the running road with respect to the traffic lane detection window using the lateral edge filter.

14. An apparatus for detecting a traffic lane mark for an automotive vehicle as claimed in claim 13, wherein the edge intensity detecting section detects the edge intensity for each of the noise detection windows which is located at the outer side with respect to the corresponding traffic lane detection window using the longitudinal edge detection filter.

15. An apparatus for detecting a traffic lane mark for an automotive vehicle as claimed in claim 1, wherein the road contour detecting section executes a broken line approximation for the traffic lane mark from the straight lines of the traffic lane mark detected by the window internal traffic lane detecting section to calculate a contour of the photographed traffic lane and projects the broken line approximated traffic lane mark into a three-dimensional space to calculate the contour of the road in the vehicular forward direction.

16. An apparatus for detecting a traffic lane mark for an automotive vehicle, comprising:

photographing means for photographing a situation of a running road in a vehicular forward direction;

traffic lane detection window setting means for setting one traffic lane detection window on an image data photographed by the photograph device;

window internal traffic lane detecting means for detecting a traffic lane mark passing through the traffic lane detection window set by the traffic lane detection window setting section on the basis of a luminance information on each point within the traffic lane detection window, the window lane detection setting means setting a plurality of other traffic lane detection windows in accordance with the one traffic lane detection window through which the traffic lane mark is passed and the window internal traffic lane detecting means detecting the traffic lane mark passing through each of the other traffic lane detection windows set by the traffic lane detection window setting means on the basis of the luminance information on each point of the other traffic lane detection windows;

noise detection window setting means for setting at least one noise detection window at a position which abuts each of the traffic lane detection windows set by the traffic lane detection window setting means;

edge intensity detecting means for detecting an edge intensity within each noise detection window set by the noise detection window setting means;

weight value modifying means for modifying a weight value to each of the traffic lane detection windows in accordance with the edge intensity in the related one of the noise detection windows; and road contour calculating means for calculating a road contour using any of the traffic lane marks detected by the window internal traffic lane detecting means and the weight value modified by the weight value modifying means.

17. A method for detecting a traffic lane mark for an automotive vehicle, comprising:

photographing a situation of a running road in a vehicular forward direction;

once setting a traffic lane detection window on an image data photographed by the photograph device;

detecting a traffic lane mark passing through the once set traffic lane detection window on the basis of a luminance information on each point within the once set traffic lane detection window;

setting a plurality of other traffic lane detection windows in accordance with the once set traffic lane detection window through which the traffic lane mark is passed;

detecting the traffic lane mark passing through each of the other traffic lane detection windows on the basis of the luminance information on each point of each corresponding other traffic detection windows;

setting at least one noise detection windows at a position which abuts each of the traffic lane detection windows;

detecting an edge intensity within each noise detection window;

modifying a weight value to each of the traffic lane detection windows in accordance with the edge intensity in the related one of the noise detection windows; and calculating a road contour using any of the detected traffic lane marks and the modified weight value.

* * * * *